(12) United States Patent
Gaskin

(10) Patent No.: US 10,647,277 B1
(45) Date of Patent: May 12, 2020

(54) AUTOMOBILE BUMPER PADDING

(71) Applicant: Rosemary Gaskin, Bronx, NY (US)

(72) Inventor: Rosemary Gaskin, Bronx, NY (US)

( * ) Notice: Subject to any disclaimer, the term of this patent is extended or adjusted under 35 U.S.C. 154(b) by 0 days.

(21) Appl. No.: 16/052,264

(22) Filed: Aug. 1, 2018

(51) Int. Cl.
*B60R 19/44* (2006.01)
*B60R 19/02* (2006.01)

(52) U.S. Cl.
CPC .......... *B60R 19/44* (2013.01); *B60R 19/023* (2013.01)

(58) Field of Classification Search
CPC ............................ B60R 19/44; B60R 19/023
See application file for complete search history.

(56) References Cited

U.S. PATENT DOCUMENTS

| | | | |
|---|---|---|---|
| 4,042,057 A * | 8/1977 | Beckley .................. | B60R 19/22 180/90 |
| 5,618,073 A | 4/1997 | Criscione | |
| 6,283,518 B1 | 9/2001 | Burtin | |
| 6,572,086 B2 * | 6/2003 | Kelly ..................... | B60R 19/44 267/136 |
| 6,692,047 B1 | 2/2004 | Solon | |
| D508,222 S * | 8/2005 | Tekavec ................ | D12/167 |
| 7,073,830 B1 | 7/2006 | Chen | |
| 8,267,462 B2 * | 9/2012 | Bogdan ................. | B60R 19/44 293/117 |
| D709,806 S | 7/2014 | Musgrove | |
| 9,505,363 B2 * | 11/2016 | Judd ..................... | B60R 19/03 |
| D775,017 S * | 12/2016 | Tekavec ................ | D12/171 |
| 9,840,216 B2 * | 12/2017 | Dagrossa ............... | B60R 19/44 |
| D814,997 S * | 4/2018 | Dagrossa ............... | D12/171 |
| 9,937,883 B2 * | 4/2018 | Dagrossa ............... | B60R 19/44 |
| 9,937,884 B2 * | 4/2018 | Dagrossa ............... | B60J 11/06 |
| D819,528 S * | 6/2018 | Dagrossa ............... | D12/171 |
| 2002/0105197 A1 | 8/2002 | Unterwagner | |
| 2004/0124661 A1 * | 7/2004 | Gentile .................. | B60R 19/44 296/136.08 |
| 2012/0278995 A1 * | 11/2012 | Kaplan ................. | A47D 15/008 5/663 |
| 2017/0210320 A1 | 7/2017 | Prevor | |
| 2019/0217798 A1 * | 7/2019 | Soleimanpour ....... | B60R 19/445 |

FOREIGN PATENT DOCUMENTS

GB          814471 A *  6/1959  ............. B60R 19/44

* cited by examiner

*Primary Examiner* — Lori L Lyjak

(57) ABSTRACT

An automobile bumper padding for easily and fully covering a vehicle bumper includes an embodiment of the disclosure meets the needs presented above by generally comprising a bumper pad having a front side, a rear side, a main panel, a right wing panel, and a left wing panel. Each of the right wing panel and the left wing panel is flexibly coupled to the main panel. The bumper pad is a shock absorptive material. The 10 main panel has a pad height and a pad width configured to cover a bumper of a vehicle. An adhesive layer is continuously disposed on the rear side of the bumper pad and is configured to secure the bumper pad to the bumper of the vehicle.

9 Claims, 5 Drawing Sheets

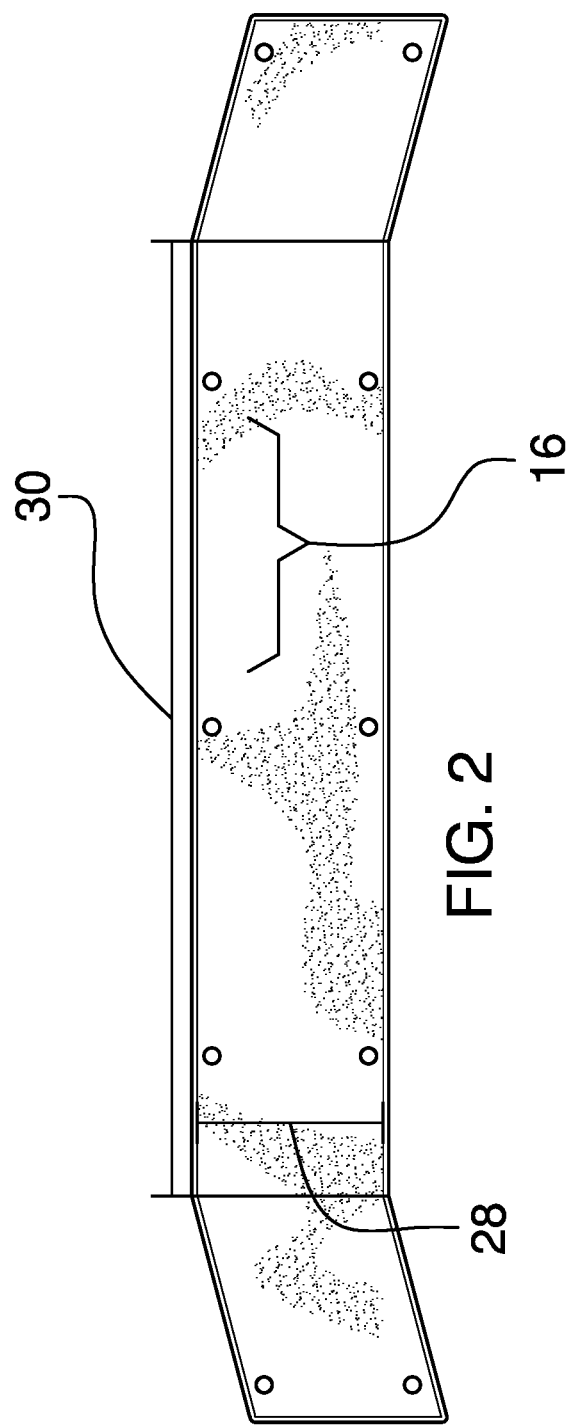
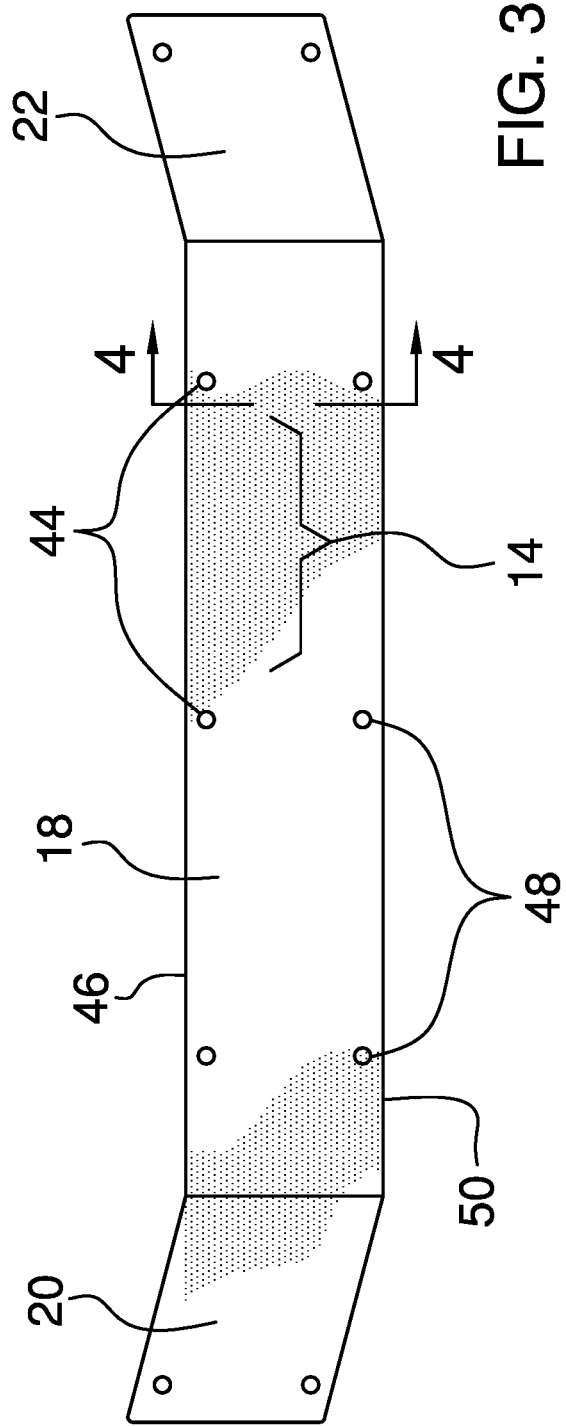

AUTOMOBILE BUMPER PADDING

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to bumper protectors and more particularly pertains to a new bumper protector for easily and fully covering a vehicle bumper.

BRIEF SUMMARY OF THE INVENTION

An embodiment of the disclosure meets the needs presented above by generally comprising a bumper pad having a front side, a rear side, a main panel, a right wing panel, and a left wing panel. Each of the right wing panel and the left wing panel is flexibly coupled to the main panel. The bumper pad is a shock absorptive material. The main panel has a pad height and a pad width configured to cover a bumper of a vehicle. An adhesive layer is continuously disposed on the rear side of the bumper pad and is configured to secure the bumper pad to the bumper of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a rear elevation view of an embodiment of the disclosure.

FIG. 3 is a front elevation view of an embodiment of the disclosure.

DETAILED DESCRIPTION OF THE INVENTION

Figure 1:
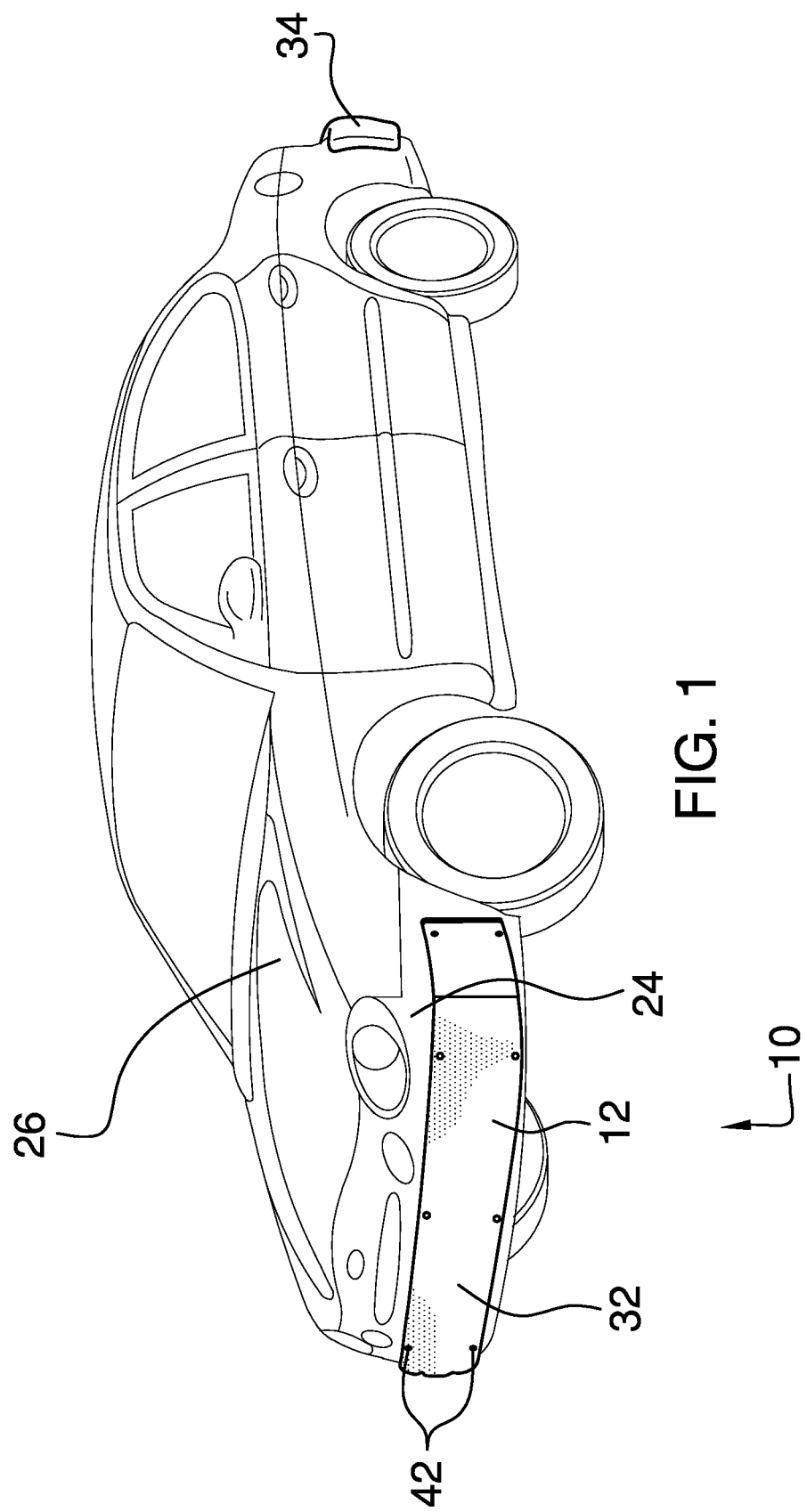
FIG. 1 is an isometric in-use view of an automobile bumper padding according to an embodiment of the disclosure.
Figure 4:
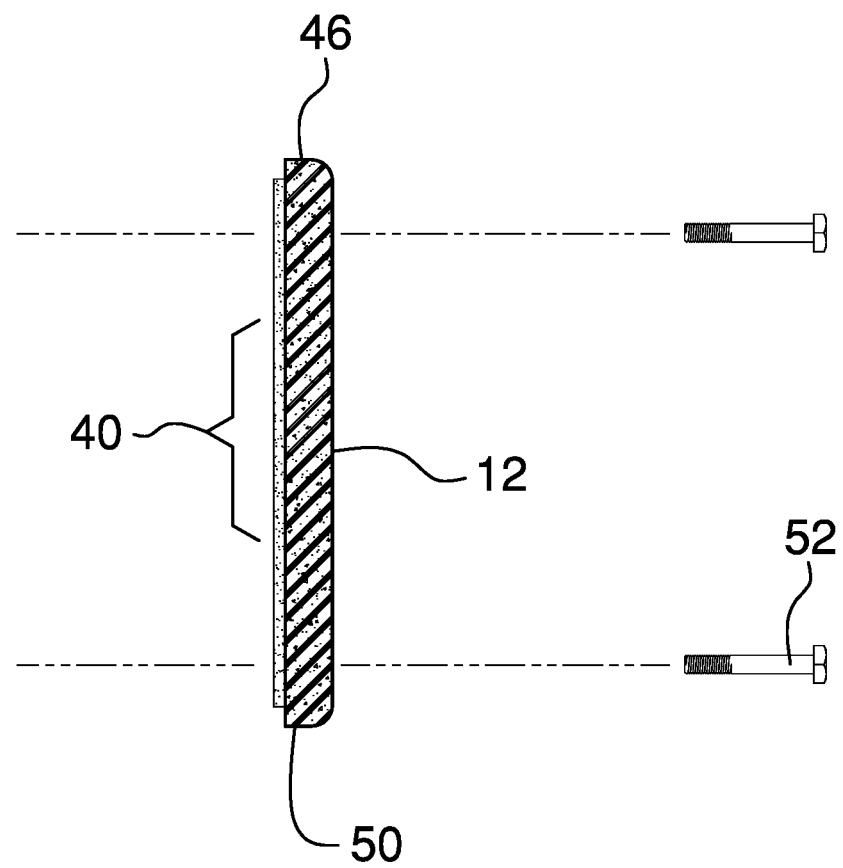
FIG. 4 is a cross-sectional view of an embodiment of the disclosure along line 4-4 of FIG. 3.
Figure 5:
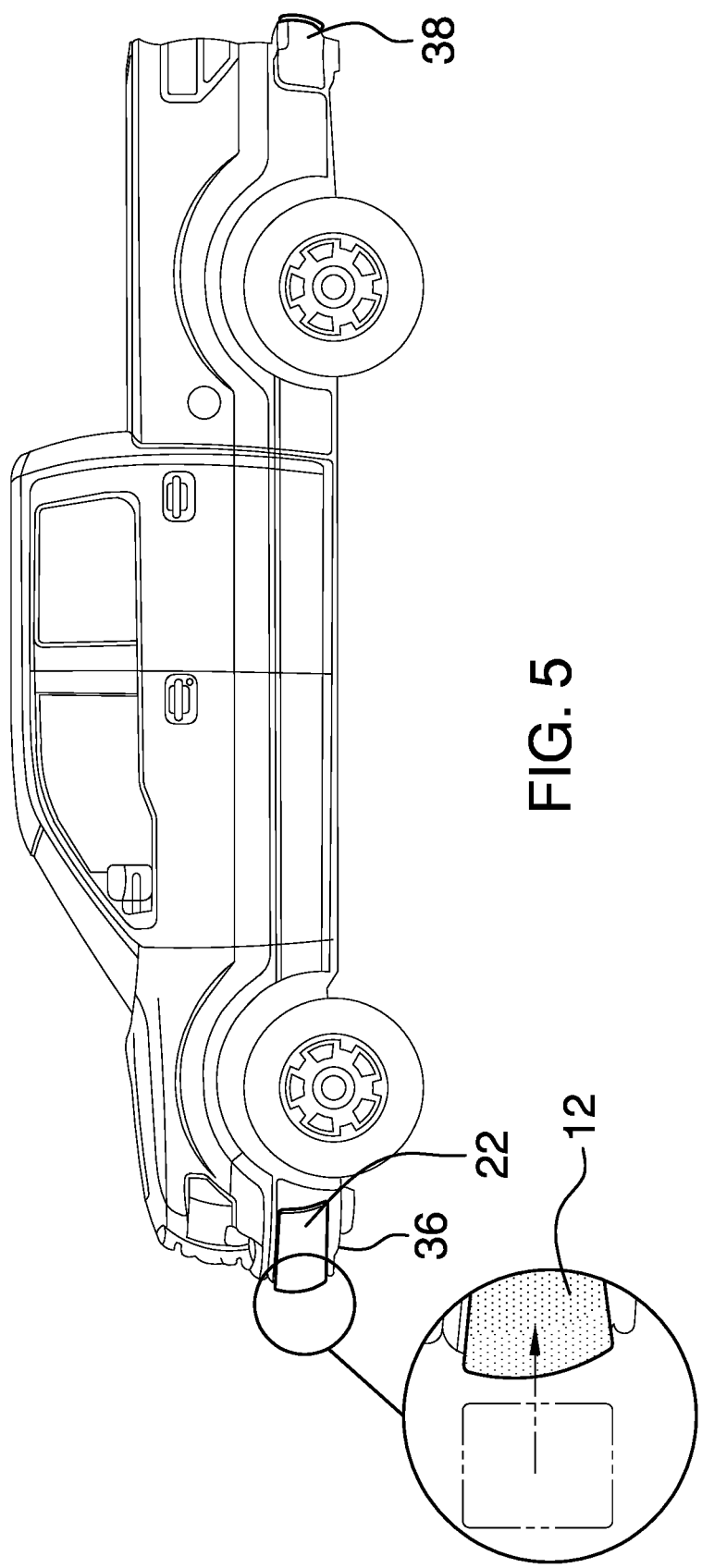
FIG. 5 is an in-use side elevation view of an embodiment of the disclosure.
Figure 6:
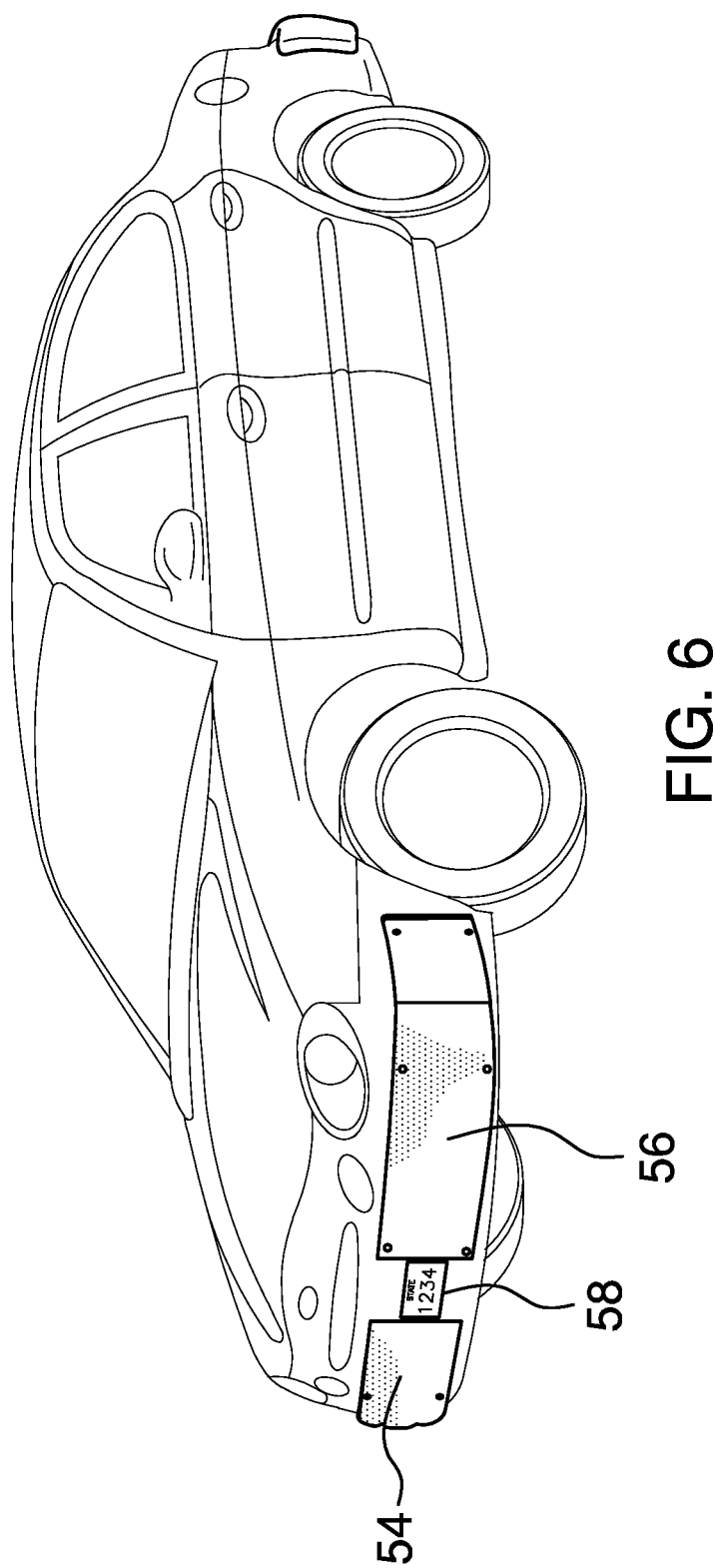
FIG. 6 is a front top side perspective view of an embodiment of the disclosure.

With reference now to the drawings, and in particular to FIGS. 1 through 6 thereof, a new bumper protector embodying the principles and concepts of an embodiment of the disclosure and generally designated by the reference numeral 10 will be described.

As best illustrated in FIGS. 1 through 6, the automobile bumper padding 10 generally comprises a bumper pad 12 having a front side 14, a rear side 16, a main panel 18, a right wing panel 20, and a left wing panel 22. Each of the right wing panel 20 and the left wing panel 22 is flexibly coupled to the main panel in order to conform to the shape of a bumper 24 of a vehicle 26. The bumper pad 12 is a shock absorptive material and may be rubberized. The main panel 18 has a pad height 28 and a pad width 30 configured to cover the bumper 24 of the vehicle 26, with the right wing and the left wing wrapping around the bumper to partially cover a right side and a left side of the vehicle, respectively. The automobile bumper padding 10 may be an automobile bumper padding kit comprising a front bumper pad 32 and a rear bumper pad 34. The pad height 28 and the pad width 30 of the main panel of the front bumper pad is configured to cover a front bumper 36 of the vehicle and the pad height and the pad width of the main panel of the rear bumper pad is configured to cover a rear bumper 38 of the vehicle.

An adhesive layer 40 is continuously disposed on the rear side 16 of the bumper pad and is configured to secure the bumper pad 12 to the bumper 24 of the vehicle. The bumper pad may have a plurality of mounting holes 42 to provide an alternative means of attaching the bumper pad to the bumper. Each of the plurality of mounting holes extends from the front side 14 through the rear side 16. The plurality of mounting holes is disposed through the main panel 18, the right wing panel 20, and the left wing panel 22. The plurality of mounting holes may comprise a plurality of upper mounting holes 44 disposed proximal an upper edge 46 of the bumper pad and a plurality of lower mounting holes 48 disposed proximal a lower edge 50 of the bumper pad. Each of the plurality of mounting holes is configured to receive a bolt 52 to secure the bumper pad to the bumper of the vehicle In an alternative embodiment of the invention, the automobile bumper padding 10 generally comprises a pair of bumper pads comprising a right bumper pad 54 and a left bumper pad 56, each of the pair of bumper pads having the front side, the rear side, and the front panel, the right bumper pad having the right wing panel and the left bumper pad having the left wing panel. This alternative embodiment allows for the pair of bumper pads to be installed on each side of a license plate 58 of the vehicle in order to leave the license plate exposed.

In use, the bumper pad 12 is fixed to the bumper 24 of the vehicle with either the adhesive layer 40 or the plurality of mounting holes 42. The automobile bumper padding may be used on the front bumper 36, the rear bumper 38, or both the front and the rear bumper of the vehicle. The bumper pad prevents damage to the bumper in the event of light contact with other vehicles and objects, particularly while parking.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An automobile bumper padding comprising:
   a bumper pad having a front side, a rear side, a main panel, a right wing panel, and a left wing panel, each of the right wing panel and the left wing panel being flexibly coupled to the main panel, the bumper pad being a shock absorptive material, the main panel having a pad height and a pad width configured to cover a bumper of a vehicle; and
   an adhesive layer coupled to the bumper pad, the adhesive layer being continuously disposed on the rear side of the bumper pad, wherein the adhesive layer is configured to secure the bumper pad to the bumper of the vehicle.

2. The automobile bumper padding of claim 1 further comprising the bumper pad having a plurality of mounting holes, each of the plurality of mounting holes extending from the front side through the rear side of the bumper pad, the plurality of mounting holes being disposed through the main panel, the right wing panel, and the left wing panel, wherein each of the plurality of mounting holes is configured to receive a bolt to secure the bumper pad to the bumper of the vehicle.

3. The automobile bumper padding of claim 2 further comprising the plurality of mounting holes comprising a plurality of upper mounting holes and a plurality of lower mounting holes, the plurality of upper mounting holes being disposed proximal an upper edge of the bumper pad and the plurality of lower mounting holes being disposed proximal a lower edge of the bumper pad.

4. The automobile bumper padding of claim 3 further comprising the plurality of upper mounting holes and the plurality of lower mounting holes each being five, three of the upper mounting holes and three of the lower mounting holes being in the main panel and one of the upper mounting holes and one of the lower mounting holes being in each of the right wing panel and the left wing panel.

5. An automobile bumper padding comprising:
   a pair of bumper pads, the pair of bumper pads comprising a right bumper pad and a left bumper pad, each of the pair of bumper pads having a front side, a rear side, a front panel, and a wing panel, the wing panel being flexibly coupled to the main panel, each of the pair of bumper pads being a shock absorptive material, the main panel having a pad height and a pad width configured to cover a bumper of a vehicle from adjacent a license plate of the vehicle to a corner of the bumper, the pair of bumper pads being configured to cover the bumper while leaving the license plate exposed; and
   an adhesive layer coupled to the bumper pad, the adhesive layer being continuously disposed on the rear side of the bumper pad, wherein the adhesive layer is configured to secure the bumper pad to the bumper of the vehicle.

6. The automobile bumper padding of claim 5 further comprising each of the pair of bumper pads having a plurality of mounting holes, each of the plurality of mounting holes extending from the front side through the rear side of the bumper pad, the plurality of mounting holes being disposed through the main panel and the wing panel of each of the pair of bumper pads, wherein each of the plurality of mounting holes is configured to receive a bolt to secure the bumper pad to the bumper of the vehicle.

7. An automobile bumper padding kit comprising:
   a pair of bumper pads, the pair of bumper pads comprising a front bumper pad and a rear bumper pad each having a front side, a rear side, a main panel, a right wing panel, and a left wing panel, each of the right wing panel and the left wing panel being flexibly coupled to the main panel, each of the pair of bumper pads being a shock absorptive material, the main panel of the front bumper pad having a front pad height and a front pad width configured to cover a front bumper of a vehicle, the main panel of the rear bumper pad having a rear pad height and a rear pad width configured to cover a rear bumper of the vehicle; and
   an adhesive layer coupled to the bumper pad, the adhesive layer being continuously disposed on the rear side of the bumper pad, wherein the adhesive layer is configured to secure each of the front bumper pad and the rear bumper pad to the front bumper and the rear bumper of the vehicle, respectively.

8. The automobile bumper padding of claim 7 further comprising each of the pair of bumper pads having a plurality of mounting holes, each of the plurality of mounting holes extending from the front side through the rear side of the bumper pad, the plurality of mounting holes being disposed through the main panel, the right wing panel, and the left wing panel, wherein each of the plurality of mounting holes is configured to receive a bolt to secure each of the front bumper pad and the rear bumper pad to the front bumper and the rear bumper of the vehicle, respectively.

9. The automobile bumper padding of claim 1, further comprising the bumper pad having a plurality of mounting holes, each of the plurality of mounting holes extending from the front side through the rear side, the plurality of mounting holes being disposed through the main panel, the right wing panel, and the left wing panel, the plurality of mounting holes comprising a plurality of upper mounting holes and a plurality of lower mounting holes, the plurality of upper mounting holes being disposed proximal an upper edge of the bumper pad and the plurality of lower mounting holes being disposed proximal a lower edge of the bumper pad, wherein each of the plurality of mounting holes is configured to receive a bolt to secure the bumper pad to the bumper of the vehicle.

* * * * *